Patented July 21, 1936

2,048,477

UNITED STATES PATENT OFFICE 2,048,477

APPARATUS FOR TESTING DEMAND METERS

Harry M. Witherow, Fort Wayne, Ind., assignor to General Electric Company, a corporation of New York Application May 16, 1934, Serial No. 725,943

5 Claims. (Cl. 73—51)

My invention relates to an apparatus for testing maximum-demand meters such as the maximum-demand meters employed in connection with the measurement of electric energy for indicating the maximum thereof.

As is known, payment for electric energy is often based upon the number of kilowatt hours consumed over a period, such as a month, plus an added amount in case the maximum rate of consumption as measured over a demand interval, such as a thirty-minute period, exceeds the average rate of consumption by an agreed amount. The reason for this is that it costs more to supply a consumer with a given amount of electric energy where his load is irregular than where his load is steady. It is important, therefore, that the maximum-demand meter be and remain accurate and it is the object of my invention to provide an apparatus for testing such meters at the time they leave the factory and from time to time during service to determine their accuracy.

Moreover, it is an object of my invention to accomplish such testing quickly and with a minimum of disturbance to the demand meter as installed in service.

Figure 1:
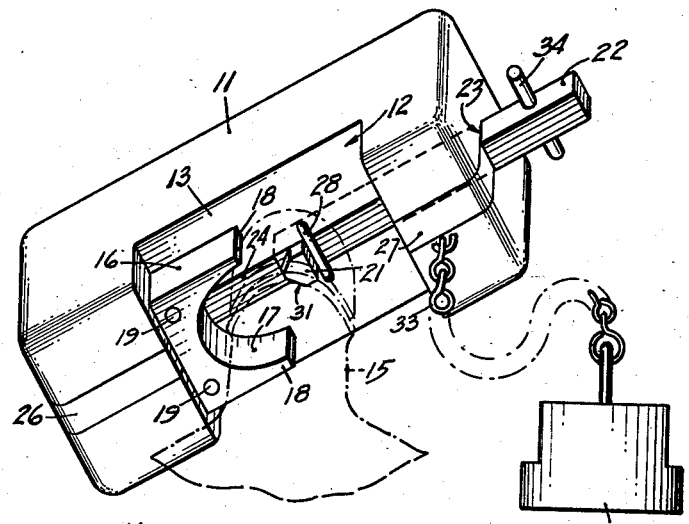
Figure 2:
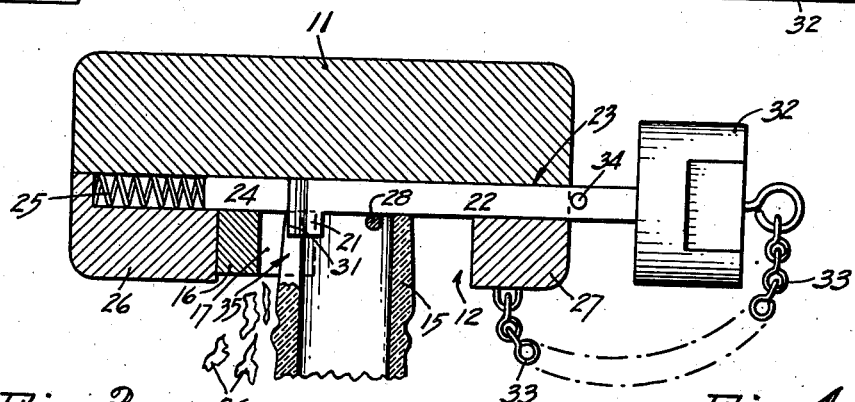
Figures 3, 4:
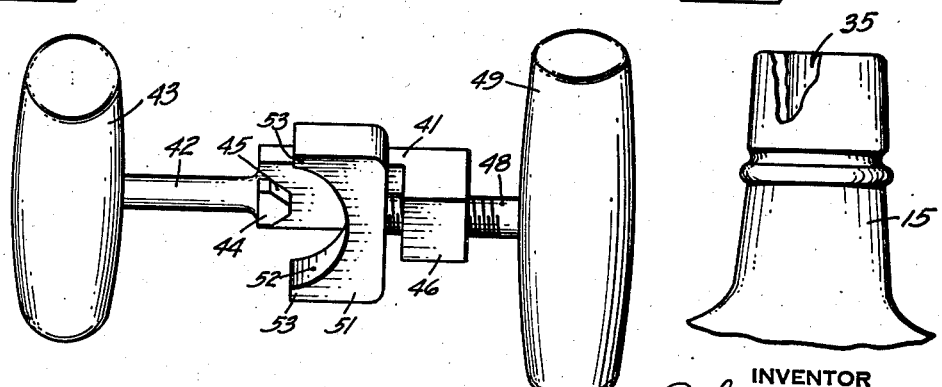

The features of my invention which are believed to be novel and patentable will be pointed out in the claims appended hereto. For a better understanding of my invention, it will be desirable to explain the essential parts and manner of operation of a maximum-demand meter and then show the application of my invention thereto. Fig. 1 illustrates an exploded view of a demand meter together with my testing device in testing relation therewith; and Fig. 2 illustrates a commercial form of demand-meter register and my testing device detached therefrom but in a position to be lowered into testing relation with the demand-meter register.

In Fig. 1, that part of the apparatus shown which comprises the testing device consists of the thumb piece 10 and the gear train comprising gears 11, 12, 13, 14, 15, 16, and 17 together with the interconnected shafts. This part is supported on a framework not shown in Fig. 1 but shown at 18 in Fig. 2 where the testing device just mentioned is shown lifted off from the demand-meter register.

In order to explain the invention, it will be desirable to first explain the demand-meter register and its normal manner of operation and, for this purpose, it will be assumed for the time being that the testing device shown connected in Fig. 1 is not present.

At 20, there is represented an ordinary integrating watt-hour meter such as is commonly used to measure the consumption of electric energy although, so far as the present invention is concerned, the nature of the metered quantity is immaterial. The rotation of meter 20 is integrated and registered on a cyclometer-type register consisting of dials 21, 22, 23, and 24 through a gear train including gears 25, 26, 27, 28. The operation of the register just mentioned is quite independent of the operation of the demand meter to be described except that both are operated from or in accordance with the common meter 20 and together constitute a common type of commercial device where a demand meter is combined with the usual totalizing registering mechanism.

The demand meter includes a friction pointer 30 which cooperates with a maximum-demand scale 31. Pointer 30 is integral with a hub 32 and finger 33 and these parts turn on a fixed bearing with sufficient friction as to remain in any position to which moved. During a demand interval, which for the purpose of illustration will be assumed to be thirty minutes but which may be anything desired, a dog or pusher arm 34 rotates in a clockwise direction in accordance with the rate of measurement of meter 20 over such demand interval. Pusher arm 34 is thus driven from meter 20 through what may be termed "the demand train" consisting of the following: shaft 35 on which the pusher arm 34 is mounted, gears 36 and 37, a hollow shaft 38, a friction clutch 39 between hollow shaft 38 and an inner shaft 40, gears 41, and gears 28. The pusher-arm shaft 35 is on the same axis of rotation as friction pointer 30, and, when the pusher arm rotates in a clockwise direction during a demand interval, it will or may come against the friction-pointer finger 33 and move the friction pointer up scale.

In Fig. 1, the friction pointer is shown as moved up scale to nearly the upper limit while the pusher arm 34 is only about halfway between its extreme positions. These parts have movements of about 180 degrees in the device shown and have zero positions where pointer 30 is at the zero or the left-hand end of scale 31 and pusher arm 34 is behind and in contact with the pointer finger 33 ready to push it up scale.

At the end of any such demand interval, pusher arm 34 is returned to its zero position and this is permitted without interference with the operation of meter 20 by the friction clutch 39; that is, the part of the demand gear train pointer pusher 34, moving friction pointer 30 (initially set to zero) up scale. Every thirty minutes, shaft 62 rotates and resets the pointer pusher or dog 34 to a zero position, leaving friction pointer 30 in the advanced position. If, in any subsequent timing interval, the demand already measured by pointer 30 is exceeded, it is advanced further up scale and, at the end of a month or other meter-reading period, it shows the maximum thirty-minute interval demand reached in the many timing intervals throughout the preceding month. The meter reader then records this reading and resets the friction pointer 30 to the zero end of the scale and with it dog 34, this being permitted by the slipping of friction clutch 39. The meter is then ready to perform the same measurements during the next month.

The mechanism involved in such a demand meter is rather delicate and present practice requires that it be closely and compactly assembled for housing in a small sealed casing.

The mechanism necessarily contains numerous gears, clutches, and intricate mechanical devices. The accuracy of its adjustment and operation is important since the customer's bill depends upon the maximum-demand measurement recorded by it. It is, therefore, important that the accuracy of the adjustments and operation of the meter be carefully checked before installation and from time to time after installation.

There are in general two possible sources of error in this mechanism: (a) those arising in the demand train and (b) those arising in the timing interval train. Errors arising in the demand train may result from the selection of improper gear ratios, the improper meshing of gears or slipping of clutch 39 when it should not slip, an improper adjustment of the micrometer screw 74, or the bending or wearing down of one of the pins 64 in disc 65. Such possibilities, if they occur, will ordinarily result in a higher or lower demand reading than should result from a perfect device.

Likewise, there is the possibility of error arising from some difficulty in the timing interval train, such as spring 53 losing its proper tension, a displacement of one of the cam arms 63, or the slipping of hook 58 on shaft 51. Such difficulties, if they occur will likewise, in all probability, produce an error in the maximum-demand reading.

My invention relates to an apparatus whereby a quick overall check of accuracy of the demand meter as a whole may be accomplished. The use of the apparatus consists in establishing a definite speed relation between the timing interval train and the demand-meter train and obtaining a resulting demand measurement. If all parts of the meter are operating properly, the resulting test measurement must produce a certain definite predetermined demand indication. If the resulting measurement is higher or lower than that determined by the speed relation selected and the constants of the meter, it is at once apparent that something is wrong with the device. There is a possibility of obtaining a correct test reading when there exist two or more errors in the operation of the device which are such as to cancel out the final result but the probability of this condition existing is obviously quite remote and, to eliminate this possibility, I prefer to make two such tests on the meter using different speed relations between the timing and the demand trains.

It will be evident to those familiar with demand meters that, in order to obtain a proper test, the relative speeds of the related parts should not be greatly different from those met with in the normal operation of the meter; also that, at the time of a resetting operation, the actual speeds of the related parts should be approximately the same or within the range of speeds met with in normal operation. On the other hand, it is undesirable to employ a method of test which requires a period of time, corresponding to the normal demand period of the meter, for its completion. These seemingly inconsistent conditions and requirements of a satisfactory test may be reconciled by operating the two trains, i. e. the demand-meter train and the timing train in some proper speed relations manually at high speed through that portion of a testing cycle other than the resetting portion thereof, and operating these parts through the resetting portion of the test cycle by the timing motor running at its normal rate.

To perform the test of the demand meter just referred to, the testing device, consisting of the framework 18 and the parts 10 to 17 carried thereby, are lowered into testing position with gear 11 meshing with gear 71 of the time train and with gear 17 meshing with a gear 75 of the demand train as represented in Fig. 1. The shaft of watt-hour meter 20 should now be disconnected from the demand-meter train. This may be done at gears 28 using the usual worm-gear-adjusting device represented at 76.

Now, it will be observed that the entire timing interval train and the entire demand interval train are connected together through the testing device in a fixed-speed driving relation. This connection consists of gears 71, 11, 12, 13, 16, 17, and 75, and this test-drive connection is such as to preserve the same relative directions of rotation of timing interval gear 71 and demand-meter train shaft 40 as in normal operation.

Now, both the timing interval train beginning at gear 71 and the demand-meter train beginning at gear 75 may be driven in the fixed-speed relation thus established and in their normal directions of rotation either by turning the thumb nut 10 clockwise or by operating the synchronous timing motor 50 in the normal manner. When the thumb nut 10 is used to drive the entire demand-meter mechanism, it can be operated at a much faster rate than with the timing motor 50. Thus, where the synchronous motor operates the mechanism through one complete resetting cycle in a demand interval of thirty minutes, the mechanism may be conveniently operated through the same cycle by turning thumb nut 10 by hand in about one-fourth of a minute. Owing to the fact that the synchonous motor cannot be operated by external torque applied to its shaft 61, the testing arrangement illustrated has the desirable feature that it cannot be turned by hand in the wrong direction i. e. it can only be turned in the direction which causes clutch 68 to overrun. The overrunning clutch and timing motor thus serves the added function of preventing backward manual operation of any part of the mechanism which, if permitted, would likely get the parts out of proper adjustment, if not causing damage thereto.

The testing device preferably includes a gear change whereby the fixed-speed relation established by one set of gears 12 and 13 may be changed to another fixed-speed relation between the timing and demand trains of the meter by demeshing gears 12 and 13 and meshing gears 14 and 15. This may be accomplished by a slight axial movement of the thumb nut shaft on which gears 12 and 14 are mounted without demeshing gears 11 and 71. To this end, gear 11 may be splined on its shaft.

I have found it convenient to make the gear ratio of the testing device such that, when one set of gears 12, 13 is meshed, the friction demand pointer 30 is advanced from a zero position over exactly 50% of the demand scale 31 between resetting operations when everything is in perfect adjustment and operating properly; also, to make the gear ratio of the testing device such that, with gears 14 and 15 in mesh, the friction pointer is advanced from zero over exactly 100% of the scale 31 under similar correct operating conditions. Other different gear ratios may be used.

Before using the testing device the speed of the synchronous motor may be checked by a watch and observing that the mark 73 on the gear 71 makes exactly one revolution per minute. The zero setting of pusher arm 34 and pointer 30 should also be correct. This adjustment is correct when the micrometer screw 74 in the zero position of pusher arm 34 just touches finger 33 of the friction pointer when the latter indicates exact zero on scale 31.

In using the testing device, it is, of course, possible to allow synchronous motor 50 to drive both the time train and the demand train throughout a test cycle which is the equivalent of a complete demand interval. This, however, takes far more time than is necessary or desirable unless the normal demand interval is very short.

It is also possible to operate the testing device manually throughout the test cycle including the resetting operation and good results may be expected if proper care is taken to turn the thumb nut 10 very slowly as the resetting operation is approached. Preferably, however, the testing device is operated manually until the resetting operation is approached, which can be ascertained either by noting the position of indicator 66 or the position of the demand pointer 30 as it is moved up scale during a testing operation, and then removing the hand from thumb piece 10 and allowing the synchronous motor to drive the parts through the resetting operation. In this way, one may be sure that the inertia and friction effects are exactly the same as in a normal-resetting operation and that normal-operating conditions exist in this important part of the test. It will be evident that, by manual opertion of the test device at high speed up to within a short distance of the point where the resetting operation occurs, the test is entirely reliable and much time is saved.

When testing with gears 12 and 13 in mesh, the friction pointer should be advanced exactly halfway up the scale 31. If it is above or below this point after this test, something is wrong with the demand meter and, if the difficulty cannot be found and easily corrected, the register should be replaced with a correct one.

After testing at one-half demand scale operation, it is advisable to shift the gears and use 14 and 15 and repeat the test for full-scale deflection. In this way, if there should be errors that happen to cancel out for the one-half scale test, they will invariably show up in the full-scale test and vice versa.

It will be noted that this test does not require any dismantling of the demand-meter register or disturbance of any of its operating parts. The framework, which carries the test gearing, is preferably provided with a guide member 77 positioned to fit, when in place, over the supporting stud 78 of the commercial demand-meter register shown in Fig. 2. When so placed, gear 11 meshes with gear 71 and gear 17 meshes with gear 75. The thumb screw, shown at 79, is then tightened slightly and the testing device is then fitted snugly over the top of the demand-meter register ready for use.

For testing demand meters combined with watt-hour meters, the cover of the meter is removed, the watt-hour meter shaft demeshed from the registering mechanism, and the test device is then placed in position as above described. The timing motor remains in operation. The complete test requires only a few minutes, and quickly shows up any error in the overall operation of the demand meter or insures maximum accuracy in a minimum of time.

In the device, as above described, I assumed a thirty-minute demand interval but the same testing device can be used for demand meters having other time intervals as the time interval is determined by the gear ratio of the timing interval train, changes in which necessitate no change in the testing device used.

The structural arrangement of the testing device will vary somewhat to fit different makes of demand-meter registers. The specific construction of the demand-meter mechanism may be quite different from that described herein without departing from the principle and test procedure of my invention. In many instances, the demand meter is separated from the watt-hour meter and the demand train is advanced by a ratchet relay which receives impulses from the distant watt-hour meter. In such a demand meter, gear 17 of my test device would engage in driving relation with that part of the demand train which is advanced by the ratchet relay.

In accordance with the provisions of the patent statutes, I have described the principle of operation of my invention together with the apparatus which I now consider to represent the best embodiment thereof but I desire to have it understood that the apparatus shown and described is only illustrative and that the invention may be carried out by other means.

What I claim as new and desire to secure by Letters Patent of the United States is:

1. A testing device for maximum-demand meters of the type having a demand train which is normally advanced in accordance with a measurement, and a time train including a timing interval mechanism for establishing equal time intervals and returning a portion of the demand train to a zero position at the end of such time intervals, said testing device consisting of a framework supporting a gear train adapted to fit onto such a demand meter and establish a drive between the demand and time trains of such meter such that these trains may be simultaneously advanced in their normal directions of operation and in a fixed-speed relation which is within the range of speed relations existing between these trains under normal-operating conditions of such meter.

2. A testing device for maximum-demand meters of the type having a demand train which is normally advanced in accordance with a measurement, and a time train including a timing interval mechanism for establishing predetermined time intervals and returning a portion of the demand train to a zero position at the ends of such time intervals, said testing device consisting of a framework, a gear train supported thereby, which gear train is adapted to fit onto such a demand meter and establish a drive between the two trains thereof, such that both trains may be simultaneously advanced through the gear train of said testing device in their normal directions of movement in a fixed-speed relation, the gear train of said testing device having a gear shift whereby either of two different such fixed-speed driving relations may be established, both of which are within the range of speed relations existing between said trains under normal-operating conditions.

3. A testing device for maximum-demand meters of the type having a demand train which is normally advanced in accordance with a measurement, a timing motor, and a time train driven by the motor and including a timing interval mechanism for establishing predetermined time intervals and for resetting a portion of the demand train to a zero position at the end of such time intervals, said testing device comprising a gear train and a framework supporting said gear train, which framework is adapted to fit onto such a demand meter and establish a fixed-speed driving relation between the two trains of such demand meter, whereby said two trains may be advanced in their normal directions of movement in such fixed-speed relation by the timing motor of such demand meter and means connected with the gear train on said test device for manually advancing said two trains in said fixed-speed relation.

4. In combination, a demand meter having a demand train which is normally advanced in accordance with a measurement, a timing motor, a time train including a timing interval mechanism normally driven by said motor for establishing demand-measurement time intervals and resetting a portion of said demand train to a zero position at the end of such intervals, and an overrunning clutch between said timing motor and time train whereby the time train may be advanced at a faster rate than it is driven by the timing motor when the latter is operating at its normal-timing rate, and a test device comprising a gear train, framework for supporting said gear train, which framework is removably fitted onto the demand meter for establishing a direct-driving connection between the two trains of said demand meter, and manual means extending from the gear train of said test device for manually advancing said demand-meter trains at a much faster rate than they are advanced under normal-operating conditions.

5. In combination, a demand meter having a demand-measuring train normally advanced in accordance with a measurement, a timing motor, a time train including timing interval mechanism driven by said motor for establishing demand-measuring time intervals and returning a portion of the demand train to a zero position at the end of such intervals, and an overrunning clutch between said motor and time train whereby the time train may be advanced at a faster rate than it is advanced by the motor when the latter is operating at its normal rate, a testing device including a gear train for establishing a driving connection between the two trains of said demand meter which produces the same relative direction of movement of both trains as exists in normal operation, manual means for driving said two trains through said test device in a fixed-speed relation and means for preventing a backward drive of said trains.

HARRY M. WITHEROW.

July 21, 1936.  J. M. YOUNG  2,048,478
BOTTLE BREAKING DEVICE
Filed Sept. 26, 1934  2 Sheets-Sheet 1

INVENTOR
John M. Young
BY
Ivan W. Thornburgh
ATTORNEY